US011655757B2

(12) United States Patent
Iwrey

(10) Patent No.: US 11,655,757 B2
(45) Date of Patent: May 23, 2023

(54) MODULAR MULTISTAGE COMPRESSOR SYSTEM FOR GAS TURBINE ENGINES

(71) Applicant: Rolls-Royce North American Technologies Inc., Indianapolis, IN (US)

(72) Inventor: Benjamin M. Iwrey, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/390,836

(22) Filed: Jul. 30, 2021

(65) Prior Publication Data

US 2023/0032126 A1    Feb. 2, 2023

(51) Int. Cl.
*F02C 3/06* (2006.01)

(52) U.S. Cl.
CPC ............ *F02C 3/06* (2013.01); *F05D 2230/10* (2013.01); *F05D 2230/21* (2013.01); *F05D 2230/51* (2013.01); *F05D 2230/52* (2013.01)

(58) Field of Classification Search
CPC ............. F05D 2230/51; F05D 2230/52; F05D 2230/60; F05D 2230/61; F05D 2230/10; F05D 2230/21; F05D 2260/80; F05D 2260/81; F05D 2220/3216; F05D 2220/3219; F05D 2230/80
USPC ......................................................... 415/912
See application file for complete search history.

(56) References Cited

U.S. PATENT DOCUMENTS

| | | | |
|---|---|---|---|
| 2,837,270 A | 6/1958 | Chapman | |
| 3,775,023 A | 11/1973 | Davis et al. | |
| 4,149,585 A * | 4/1979 | Sterlini | F24T 10/40 62/79 |
| 5,062,766 A | 11/1991 | Miura et al. | |
| 5,267,397 A * | 12/1993 | Wilcox | F01D 25/285 29/889.1 |
| 6,051,050 A * | 4/2000 | Keefer | B01D 53/06 96/144 |
| 6,402,482 B1 | 6/2002 | Lee | |
| 7,117,839 B2 | 10/2006 | Horstin | |
| 7,752,836 B2 | 7/2010 | Orlando et al. | |
| 8,209,952 B2 | 7/2012 | Ress | |
| 8,251,639 B2 | 8/2012 | Talan | |
| 8,756,938 B2 * | 6/2014 | Sasahara | F02C 6/18 60/773 |
| 9,328,669 B2 * | 5/2016 | Rizkalla | G05B 15/02 |
| 9,970,360 B2 * | 5/2018 | Marini | F02C 9/20 |
| 10,578,027 B1 * | 3/2020 | MacDougall | F01D 21/10 |
| 10,883,424 B2 | 1/2021 | Lefebvre | |
| 11,519,276 B1 * | 12/2022 | Snider | F01D 5/16 |
| 2003/0131606 A1 | 7/2003 | Loebig et al. | |
| 2009/0314003 A1 * | 12/2009 | Talan | F04D 25/022 60/778 |
| 2010/0000198 A1 * | 1/2010 | Talan | F02C 7/36 60/39.24 |

(Continued)

*Primary Examiner* — Sarang Afzali
*Assistant Examiner* — Darrell C Ford
(74) *Attorney, Agent, or Firm* — Barnes & Thornburg LLP

(57) ABSTRACT

A method of assembling a gas turbine engine is disclosed herein. The method comprises providing a set of standard axial compressor stages. Each axial compressor stage included in the set of standard axial compressor stages includes a rotor having a plurality of blades configured to rotate about an axis and a stator having a plurality of stator vanes.

20 Claims, 5 Drawing Sheets

(56) References Cited

U.S. PATENT DOCUMENTS

| | | | |
|---|---|---|---|
| 2011/0142607 A1* | 6/2011 | Ciro | F04D 29/023 |
| | | | 415/200 |
| 2013/0282307 A1* | 10/2013 | El Shamy | G06F 30/17 |
| | | | 702/33 |
| 2014/0123625 A1* | 5/2014 | Snell | F02K 1/18 |
| | | | 60/204 |
| 2016/0187893 A1* | 6/2016 | Bergh | G05D 16/2046 |
| | | | 137/565.11 |
| 2016/0222970 A1* | 8/2016 | Becker | F02C 1/02 |
| 2017/0074110 A1* | 3/2017 | Fremont | F01D 9/041 |
| 2018/0023591 A1* | 1/2018 | Adjan | F04D 27/0246 |
| | | | 415/209.3 |
| 2018/0066662 A1* | 3/2018 | Takahashi | F02C 3/06 |
| 2018/0283402 A1* | 10/2018 | Maeda | F04D 17/122 |
| 2019/0017393 A1* | 1/2019 | Iurisci | F01D 5/24 |
| 2019/0285081 A1* | 9/2019 | Sishtla | F04D 17/10 |
| 2020/0123984 A1* | 4/2020 | Phelps | F02C 7/36 |
| 2020/0256192 A1* | 8/2020 | Reynolds | F01D 5/06 |
| 2020/0386407 A1 | 12/2020 | Menheere et al. | |

\* cited by examiner

MODULAR MULTISTAGE COMPRESSOR SYSTEM FOR GAS TURBINE ENGINES

FIELD OF THE DISCLOSURE

The present disclosure relates generally to gas turbine engines, and more specifically to methods of assembling gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

As new market areas develop, gas turbine engines with a wide range of engine performance capabilities may be designed to meet these new demands. However, current design methods for designing and building gas turbine engines may not keep up with the expanding market. The current methods often include full redesigns of commercial engines, which may be slow and expensive. Therefore, new methods for rapidly designing gas turbine engines with different engine performance capabilities may be beneficial in satisfying the expanding market demands.

SUMMARY

The present disclosure may comprise one or more of the following features and combinations thereof.

A method of assembling a gas turbine engine may comprise providing a set of standard axial compressor stages. Each axial compressor stage of the set of standard axial compressor stages may include a rotor having a plurality of blades configured to rotate about an axis and a stator having a plurality of stator vanes. The set of standard axial compressor stages may range from a first compressor stage to an $N^{th}$ compressor stage where N is a natural number greater than 1 and whereby a radial length of the plurality of blades and a radial length of the stator vanes on each compressor stage included in the standard compressor stages gradually decreases in size from the first compressor stage to the $N^{th}$ compressor stage.

In some embodiments, the method may further comprise determining an engine performance capability for the gas turbine engine. The engine performance capability may include a predetermined inlet corrected flow and a predetermined pressure ratio.

In some embodiments, the method may further comprise selecting an initial axial compressor stage from the set of standard axial compressor stages for the gas turbine engine based on the predetermined inlet corrected flow. The initial axial compressor stage may be the furthest axially upstream compressor stage in a compressor of the compressor for the gas turbine engine.

In some embodiments, the method may further comprise adding any number of sequential axial compressor stages from the set of standard axial compressor stages downstream of the initial axial compressor stage. The number of sequential axial compressor stages added downstream of the initial axial compressor stage may be based on the predetermined pressure ratio to provide the gas turbine engine.

In some embodiments, the initial axial compressor stage may be any compressor stage other than the $N^{th}$ compressor stage included in the set of standard axial compressor stages. In some embodiments, a furthest downstream axial compressor stage included in the number of sequential axial compressor stages may not be the $N^{th}$ compressor stage.

In some embodiments, the method may further comprise providing a set of standard centrifugal compressors. Each centrifugal compressor of the set of standard centrifugal compressor may include an impeller having a plurality of impeller blades and a diffuser located downstream of the impeller. The set of standard centrifugal compressors may range from a first centrifugal compressor to an $M^{th}$ centrifugal compressor where M is a natural number greater than 1 and whereby a height of the plurality of impeller blades on each centrifugal compressor included in the standard centrifugal compressors gradually decreases in size from the first centrifugal compressor to the $M^{th}$ centrifugal compressor.

In some embodiments, the method may further comprise selecting one centrifugal compressor from the set of standard centrifugal compressors. The one centrifugal compressor may be selected based on a size of a furthest downstream axial compressor stage included in the number of sequential axial compressor stages.

In some embodiments, the method may further comprise locating the one centrifugal compressor downstream of the furthest axially downstream axial compressor stage. In some embodiments, the impeller of each centrifugal compressor of the set of standard centrifugal compressors may have the same hub radius relative to the axis.

In some embodiments, the method may further comprise sizing a combustor based on the size of the first axial compressor stage included in the set of standard axial compressor stages. The method may further comprise installing the combustor in the gas turbine engine axially downstream of the one centrifugal compressor.

In some embodiments, the method may further comprise providing a turbine section for the gas turbine engine. The method may further comprise installing the turbine section in the gas turbine engine downstream of the combustor.

In some embodiments, the method may further comprise providing a set of standard nozzle guide vanes. Each nozzle guide vane of the set of standard nozzle guide vanes may include an outer platform, an inner platform spaced apart radially from the outer platform to define a gas path boundary therebetween, and an airfoil that extends radially between the outer platform and the inner platform. The set of standard nozzle guide vanes may range from a first nozzle guide vane to a $Z^{th}$ nozzle guide vane where Z is a natural number greater than 1 and whereby a radial height of the gas path boundary of each nozzle guide vane included in the set of standard nozzle guide vanes gradually decreases in size from the first nozzle guide vane to the $Z^{th}$ nozzle guide vane.

In some embodiments, the method may further comprise selecting one nozzle guide vane from the set of standard nozzle guide vanes. The one nozzle guide vane may be selected based on a size of the furthest downstream axial compressor stage included in the number of sequential axial compressor stages. In some embodiments, the method may further comprise locating the one nozzle guide vane downstream of the combustor and upstream of the turbine section.

In some embodiments, the method may further comprise providing a standard centrifugal compressor stage. The standard centrifugal compressor stage may include an impeller having a plurality of impeller blades and a diffuser located downstream of the impellor having a plurality of diffuser vanes.

In some embodiments, the method may further comprise machining each of the impeller blades and the diffuser vanes of the standard centrifugal compressor stage to a predetermined radial height. The predetermined radial height may be based on a size of a furthest downstream axial compressor stage included in the number of sequential axial compressor stages. In some embodiments, the method may further comprise locating the machined centrifugal compressor downstream of the furthest axially downstream axial compressor stage.

In some embodiments, the method may further comprise determining a height of the plurality of impeller blades for an impeller included in a centrifugal compressor. The height of the plurality of impeller blades may be determined based on a size of a furthest downstream axial compressor stage included in the number of sequential axial compressor stages.

In some embodiments, the method may further comprise casting the impeller for the centrifugal compressor with a plurality of impeller blades having the determined height. The method may further comprise locating the centrifugal compressor downstream of the furthest axially downstream axial compressor stage.

According to another aspect of the present disclosure, a method may comprise providing a set of standard axial compressor stages. Each axial compressor stage may include a rotor having a plurality of blades configured to rotate about an axis. The set of standard axial compressor stages may range from a first compressor stage to an $N^{th}$ compressor stage where N is a natural number greater than 1 and whereby a radial length of the plurality of blades on each compressor stage included in the standard compressor stages gradually decreases in size from the first compressor stage to the $N^{th}$ compressor stage.

In some embodiments, the method may further comprise determining an engine performance capability for a first gas turbine engine. The engine performance capability may include a first predetermined inlet corrected flow and a first predetermined pressure ratio.

In some embodiments, the method may further comprise selecting an initial axial compressor stage from the set of standard axial compressor stages for the first gas turbine engine. The initial axial compressor stage may be selected based on the first predetermined inlet corrected flow. The initial axial compressor stage may be the furthest axially upstream compressor stage in a compressor of the first gas turbine engine.

In some embodiments, the method may further comprise adding any number of sequential axial compressor stages from the set of standard axial compressor stages downstream of the initial axial compressor stage for the first gas turbine engine. The number of sequential axial compressor stages added downstream of the initial axial compressor stage may be based on the first predetermined pressure ratio to provide the compressor for the first gas turbine engine.

In some embodiments, the method may further comprise determining an engine performance capability for a second gas turbine engine. The engine performance capability may include a second predetermined inlet corrected flow and a second predetermined pressure ratio. The second predetermined inlet corrected flow and the second predetermined pressure ratio may be different from the first predetermined inlet corrected flow and the first predetermined pressure ratio for the first gas turbine engine.

In some embodiments, the method may further comprise selecting an initial axial compressor stage from the set of standard axial compressor stages for the second gas turbine engine. The initial axial compressor stage may be selected based on the second predetermined inlet corrected flow. The initial axial compressor stage may be the furthest axially upstream compressor stage in a compressor of the second gas turbine engine.

In some embodiments, the method may further comprise adding any number of sequential axial compressor stages from the set of standard axial compressor stages downstream of the initial axial compressor stage for the second gas turbine engine. The number of sequential axial compressor stages added downstream of the initial axial compressor stage may be based on the second predetermined pressure ratio to provide the compressor for the second gas turbine engine.

In some embodiments, the number of sequential compressor stages for the second gas turbine engine may be different from the number of sequential compressor stages for the first gas turbine engine. In some embodiments, the initial axial compressor stage for one of the first gas turbine engine and the second gas turbine engine may be any compressor stage other than the $N^{th}$ compressor stage included in the set of standard axial compressor stages. In some embodiments, a furthest downstream axial compressor stage included in the number of sequential axial compressor stages for one of the first gas turbine engine and the second gas turbine engine may not be the $N^{th}$ compressor stage.

In some embodiments, the method may further comprise providing a set of standard centrifugal compressors. Each centrifugal compressor may include an impeller having a plurality of impeller blades and a diffuser located downstream of the impeller. The set of standard centrifugal compressors may range from a first centrifugal compressor to an $M^{th}$ centrifugal compressor where M is a natural number greater than 1 and whereby a height of the plurality of impeller blades on each centrifugal compressor included in the standard centrifugal compressors gradually decreases in size from the first centrifugal compressor to the $M^{th}$ centrifugal compressor.

In some embodiments, the method may further comprise selecting one centrifugal compressor from the set of standard centrifugal compressors. The one centrifugal compressor may be selected based on a size of a furthest downstream axial compressor stage included in the number of sequential axial compressor stages for the first gas turbine engine. In some embodiments, the method may further comprise locating the one centrifugal compressor downstream of the furthest axially downstream axial compressor stage in the first gas turbine engine.

In some embodiments, the method may further comprise selecting one centrifugal compressor from the set of standard centrifugal compressors. The one centrifugal compressor may be selected based on a size of a furthest downstream axial compressor stage included in the number of sequential axial compressor stages for the second gas turbine engine.

In some embodiments, the method may further comprise locating the one centrifugal compressor downstream of the furthest axially downstream axial compressor stage in the second gas turbine engine. The one centrifugal compressor for the second gas turbine engine may be different from the one centrifugal compressor for the first gas turbine engine.

In some embodiments, the method may further comprise sizing a combustor based on the size of the first axial compressor stage included in the set of standard axial compressor stages. The method may further comprise installing the combustor in the first gas turbine engine axially downstream of the compressor.

In some embodiments, the method may further comprise installing the combustor in the second gas turbine engine axially downstream of the compressor. The number of sequential compressor stages for the second gas turbine engine may be different from the number of sequential compressor stages for the first gas turbine engine.

In some embodiments, the method may further comprise providing a set of standard nozzle guide vanes. Each nozzle guide vane may include an outer platform, an inner platform spaced apart radially from the outer platform to define a gas path boundary therebetween, and an airfoil that extends radially between the outer platform and the inner platform. The set of standard nozzle guide vanes may range from a first nozzle guide vane to a $Z^{th}$ nozzle guide vane where Z is a natural number greater than 1 and whereby a radial height of the gas path boundary of each nozzle guide vane included in the set of standard nozzle guide vanes gradually decreases in size from the first nozzle guide vane to the $Z^{th}$ nozzle guide vane.

In some embodiments, the method may further comprise selecting one nozzle guide vane from the set of standard centrifugal compressors for the first nozzle guide vane. The one nozzle guide vane may be selected based on a size of a furthest downstream axial compressor stage included in the number of sequential axial compressor stages for the first gas turbine engine. In some embodiments, the method may further comprise locating the one nozzle guide vane in the first gas turbine engine downstream of the compressor.

In some embodiments, the method may further comprise selecting one nozzle guide vane from the set of standard centrifugal compressors for the second gas turbine engine. The one nozzle guide vane may be selected based on a size of a furthest downstream axial compressor stage included in the number of sequential axial compressor stages for the second gas turbine engine. In some embodiments, the method may further comprise locating the one nozzle guide vane in the second gas turbine engine downstream of the compressor.

In some embodiments, the one nozzle guide vane for the second gas turbine engine may be a different size compared to the one nozzle guide vane for the first gas turbine engine. In some embodiments, the one nozzle guide vane for the second gas turbine engine may be the same size as the one nozzle guide vane for the first gas turbine engine.

In some embodiments, the method may further comprise providing a standard centrifugal compressor stage. The standard centrifugal compressor stage may include an impeller having a plurality of impeller blades and a diffuser located downstream of the impellor having a plurality of diffuser vanes.

In some embodiments, the method may further comprise machining each of the impeller blades and the diffuser vanes of the standard centrifugal compressor stage to a first predetermined radial height. The first predetermined radial height may be based on a size of a furthest downstream axial compressor stage included in the number of sequential axial compressor stages for the first gas turbine engine.

In some embodiments, the method may further comprise providing another standard centrifugal compressor stage. The method may further comprise machining each of the impeller blades and the diffuser vanes of the another standard centrifugal compressor stage to a second predetermined radial height. The second predetermined radial height may be based on a size of a furthest downstream axial compressor stage included in the number of sequential axial compressor stages for the second gas turbine engine. In some embodiments, the second predetermined radial height may be different from the first predetermined radial height.

These and other features of the present disclosure will become more apparent from the following description of the illustrative embodiments.

DETAILED DESCRIPTION OF THE DRAWINGS

Figure 1:
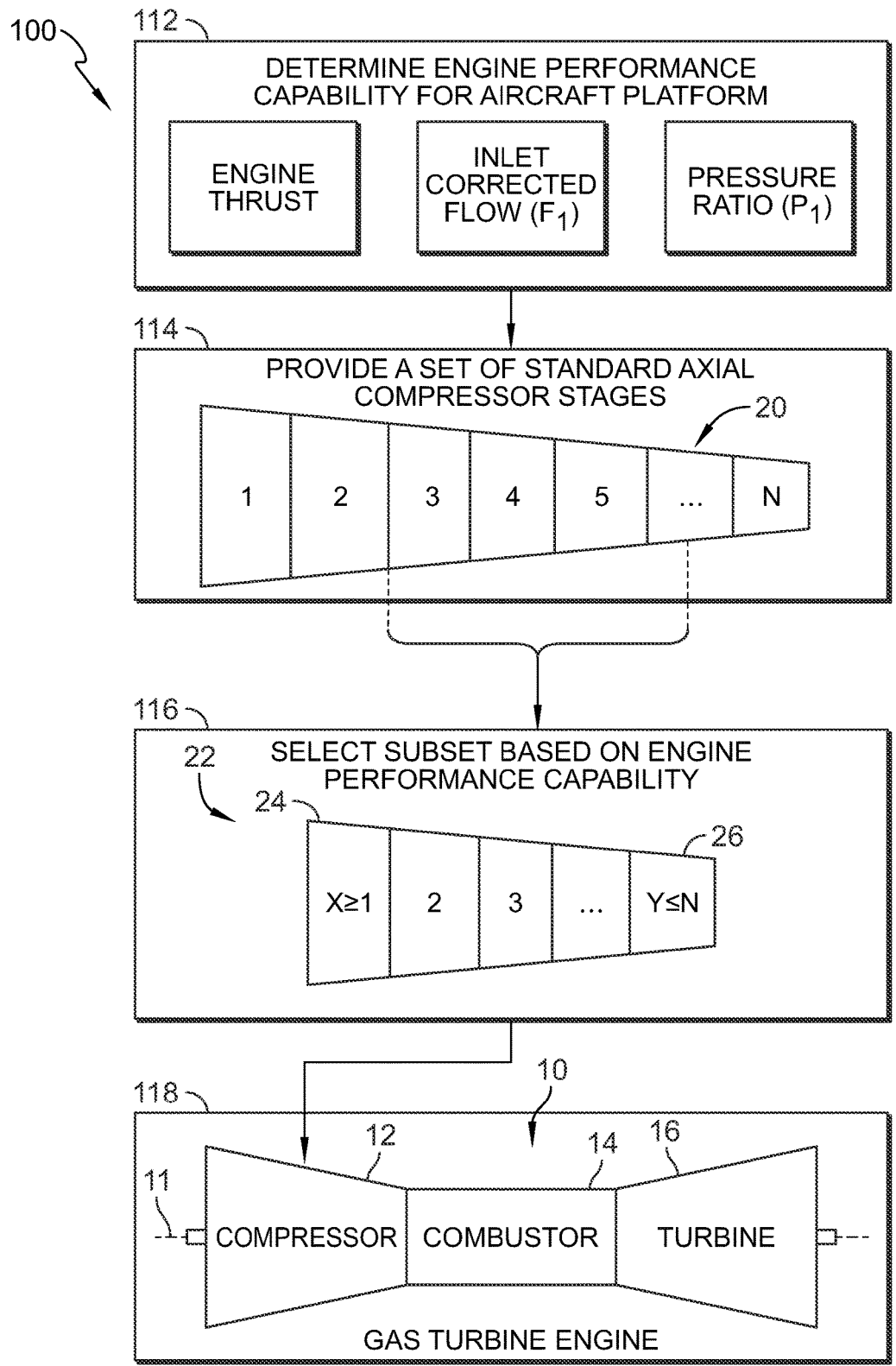
FIG. 1 is a diagrammatic view of a method of assembling a gas turbine engine showing the method comprises assembling a compressor for the gas turbine engine by selecting a subset of axial compressor stages from a set of standard axial compressor stages based on predetermined engine performance capabilities to provide a compressor for the gas turbine engine.

For the purposes of promoting an understanding of the principles of the disclosure, reference will now be made to a number of illustrative embodiments illustrated in the drawings and specific language will be used to describe the same.

A method 100 of assembling a gas turbine engine 10 is shown in FIGS. 1-5. The gas turbine engine 10 is designed to meet desired engine performance capabilities by assembling a compressor 12 for the gas turbine engine 10 from a set of standard axial compressor stages 20. Each axial compressor stage of the set of standard axial compressor stages 20 includes a rotor 30 having a plurality of blades 32 configured to rotate about an axis 11 and a stator 34 having a plurality of stator vanes 36.

The set of standard axial compressor stages 20 ranges from a first compressor stage to an $N^{th}$ compressor stage as shown in FIG. 1. For the $N^{th}$ compressor stage, N is a natural number greater than 1. From the first compressor stage to the $N^{th}$ compressor stage, a radial length of the plurality of blades and a radial length of the stator vanes on each compressor stage gradually decreases in size as suggested in FIGS. 1 and 3. The set of standard axial compressor stages 20 are set in size for each stage and do not change.

The set of standard axial compressor stages 20 covers a wide range of engine performance capabilities, such as cycle-level core compressor capabilities of a wide range of engine rated thrust. To begin assembling the gas turbine engine 10, the desired engine performance capabilities for the gas turbine engine is determined as suggested by box 112 in FIG. 1. Based on the engine performance capabilities for the gas turbine engine 10, a subset of the axial compressor stages 22 from the set of standard axial compressor stages 20 is selected as suggested by box 116. The selected subset of axial compressor stages 22 from the set of standard axial compressor stages 20 provides the compressor 12 for the gas turbine engine 10. In this way, many engines each with differing capabilities can be designed and assembled using different subsets of the common set of standard axial compressor stages 20.

The emerging engine market presents both opportunities and challenges. The opportunities may include new potential projects and large production batches. The challenges may include shorter engine development time, but still covering a wide range of rated thrust values. The attritable market range of rated thrusts may be between 1,500-5,500 lbf (or even wider), which may not be efficiently or practically achieved by a single engine or a single high-pressure spool with varying low-pressure spool designs.

The method 100 includes providing the set of standard axial compressor stages 20 as suggested by box 114 in FIG. 1. The set of standard axial compressor stages 20 covers a wide range of engine performance capabilities. Then from the set of standard axial compressor stages 20, the subset of axial compressor stages 22 is selected based on the desired engine performance capabilities, which falls within the range provided by the set of standard axial compressor stages 20. In this way, a new gas turbine engine 10 may be assembled for the engine rated thrust with minimal additional design and development effort.

Figure 2:
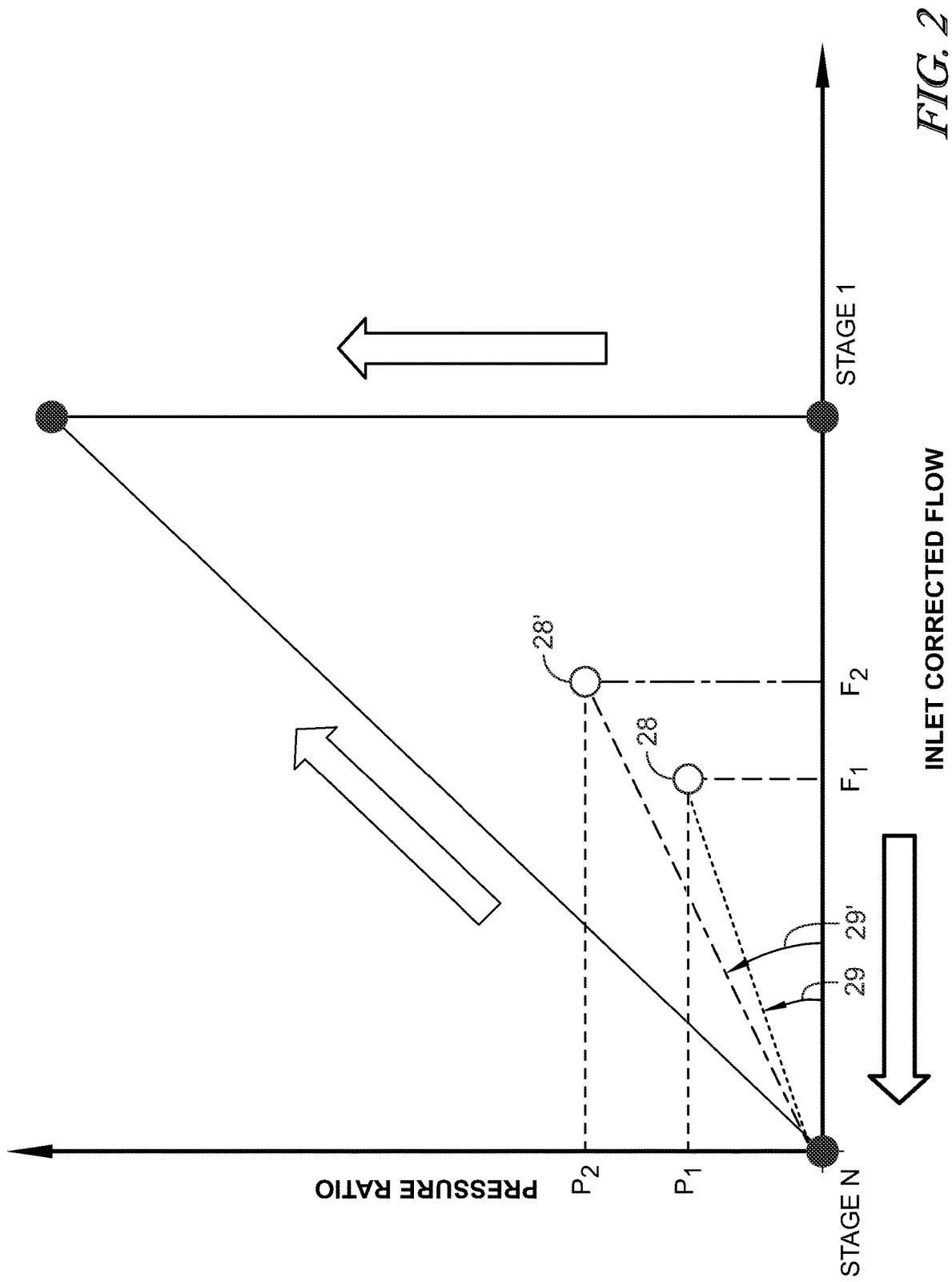
FIG. 2 is a diagrammatic graph associated with the method for selecting the subset of axial compressor stages from the set of standard axial compressor stages showing an initial axial compressor stage is selected from the set of standard axial compressor stages for the gas turbine engine based on a desired predetermined inlet corrected flow of the engine and a number of sequential axial compressor stages from the set of standard axial compressor stages is added downstream of the initial axial compressor stage based on a desired predetermined pressure ratio of the engine.

The engine performance capabilities used for designing the gas turbine engine 10 to be assembled includes a predetermined inlet corrected flow $F_1$ and a predetermined pressure ratio $P_1$ as shown in FIGS. 1 and 2. The inlet corrected flow $F_1$ and the pressure ratio $P_1$ affect the number of axial compressor stages of the compressor 12.

To select the subset of axial compressor stages 22 from the set of standard axial compressor stages 20, the method comprises selecting an initial axial compressor stage 24 from the set of standard axial compressor stages 20 for the gas turbine engine 10 based on the predetermined inlet corrected flow $F_1$ as shown in FIGS. 1 and 2. The initial axial compressor stage 24 is the furthest axially upstream compressor stage in the compressor 12 for the gas turbine engine 10.

The initial axial compressor stage 24 is any compressor stage other than the $N^{th}$ compressor stage included in the set of standard axial compressor stages 20. In some embodiments, the initial axial compressor stage 24 may be the first compressor stage included in the set of standard axial compressor stages 20.

The method 100 continues by adding any number of sequential axial compressor stages from the set of standard axial compressor stages 20 downstream of the initial axial compressor stage 24 based on the predetermined pressure ratio $P_1$ as shown in FIGS. 1 and 2. The number of sequential axial compressor stages may vary depending on the predetermined pressure ratio $P_1$ for the gas turbine engine 10. The greater the pressure ratio $P_1$, the more sequential axial compressor stages are coupled downstream of the initial axial compressor stage 24. Conversely, if the pressure ratio $P_1$ is to be lower, fewer sequential axial compressor stages are coupled downstream of the initial axial compressor stage 24. In the illustrative embodiment, a furthest downstream axial compressor stage 26 included in the number of sequential axial compressor stages is not the $N^{th}$ compressor stage.

As one example, the set of standard axial compressor stages 20 includes 14 stages and an axial compressor is assembled using stages 3-8 of the standard axial compressor stages 20 to achieve the desired engine performance characteristics. In another example, stages 1-10 are used. In another example, stages 1-14 are used. In another example, stages 2-14 are used. As can be seen with these examples, any sequential subset of stages from the set of standard axial compressor stages 20 may be used.

The graph shown in FIG. 2 shows the method of selecting the initial axial compressor stage 24 and the number of sequential axial compressor stages. The x-coordinate on the graph shown in FIG. 2 corresponds to the initial axial compressor stage 24. The angle 29 plotted line connecting the plotted coordinate 28 to the origin corresponds to the number of axial compressor stages to couple downstream of the initial axial compressor stage 24.

Once the subset of axial compressor stages 22 is selected, the subset of axial compressor stages 22 is installed as the compressor 12 in the gas turbine engine 10 as suggested by box 118 in FIG. 1. Then, the remaining components of the gas turbine engine 10 may be assembled based on the provided compressor 12.

Figure 3:
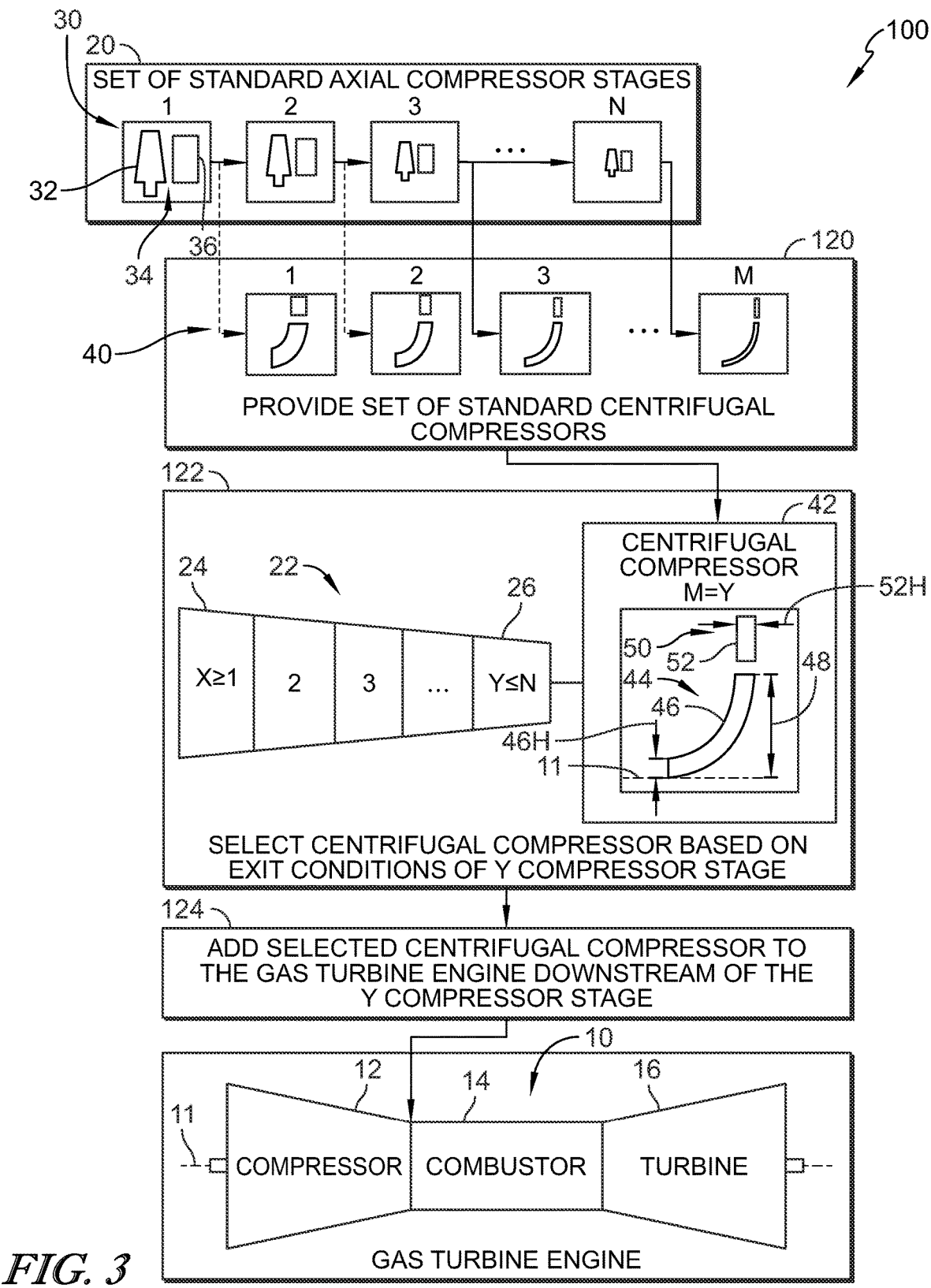
FIG. 3 is a diagrammatic view of the method of assembling the gas turbine engine of FIG. 1 showing the method further comprises selecting a centrifugal compressor from a set of standard centrifugal compressors based on a size of a furthest downstream axial compressor stage included in the number of sequential axial compressor stages and locating the centrifugal compressor downstream of the compressor in the gas turbine engine.

The method may continue by assembling the centrifugal compressor 42 in the gas turbine engine 10 as shown in FIG. 3. In other engines, a centrifugal compressor stage 42 is not desired and the stage 42 is omitted. For assembling the centrifugal compressor 42, the method includes providing a set of standard centrifugal compressors 40 as suggested by box 120 in FIG. 3. Each centrifugal compressor included in the set of standard centrifugal compressors 40 includes an impeller 44 having a plurality of impeller blades 46 and a diffuser 50 having a plurality of diffuser vanes 52 located downstream of the impeller 44.

The set of standard centrifugal compressors 40 ranges from a first centrifugal compressor to an $M^{th}$ centrifugal compressor as shown in FIG. 3. For the $M^{th}$ centrifugal compressor, M is a natural number greater than 1. From the first centrifugal compressor to the $M^{th}$ centrifugal compressor, a height of the plurality of impeller blades 46 on each centrifugal compressor gradually decreases in size as suggested in FIG. 3.

The impeller 44 of each centrifugal compressor of the set of standard centrifugal compressors 40 has a same hub radius 48 relative to the axis 11 of the gas turbine engine 10. The height 46H of the plurality of impeller blades 46 and the height of the diffuser vanes 52H on each centrifugal compressor gradually decreases in size, while the hub radius 48 of the impeller 44 remains the same.

The method 100 continues by selecting one centrifugal compressor 42 from the set of standard centrifugal compressors 40 based on the last axial compressor stage 26, i.e. the furthest downstream axial compressor stage included in the subset of axial compressor stages 22. The centrifugal compressor sage 42 is selected based on a size of the last axial compressor stage 26 as suggested by box 122 in FIG. 3. The selected centrifugal compressor 42 is then located downstream of the last axial compressor stage 26 as suggested by box 124 in FIG. 3.

In some embodiments, the method includes providing a standard centrifugal compressor stage from which the centrifugal compressor 42 for the gas turbine engine 10 is machined. The standard centrifugal compressor has the standard hub radius 48 as the set of standard centrifugal compressors 40. As a result, the set of standard centrifugal compressors 40 may include a single standard centrifugal impeller sized for the largest height 46H. The standard centrifugal impeller may then have the height 46H of the blades 46 reduced according to set parameters to provide the specific impeller for a given engine build.

For example, if only the first stage of the set of standard axial compressor stages 20 is used for the subset 22 (and therefore is the last downstream axial stage), then the standard centrifugal impeller 44 is used without machining or other alteration. If the $3^{rd}$ stage of the set 20 is used for the subset 22, then the blades 46 of the standard centrifugal impeller 44 are machined according to the predetermined parameters associated with the $3^{rd}$ stage being the last downstream axial compressor stage.

To form the centrifugal compressor 42 for the gas turbine engine 10, each of the impeller blades 46 and the diffuser vanes 52 of the standard centrifugal compressor stage are machined to a predetermined radial height based on the size of last axial compressor stage 26 included in the subset of axial compressor stages 22.

In other embodiments, the dimensions for the centrifugal compressor 42 are determined based off the size of last axial compressor stage 26 included in the subset of axial compressor stages 22. With the dimensions determined, the method 100 includes casting the centrifugal compressor 42 with the determined dimensions, i.e. the height 46H of the plurality of impeller blades 46 and the height of the diffuser vanes 52H.

Figure 4:
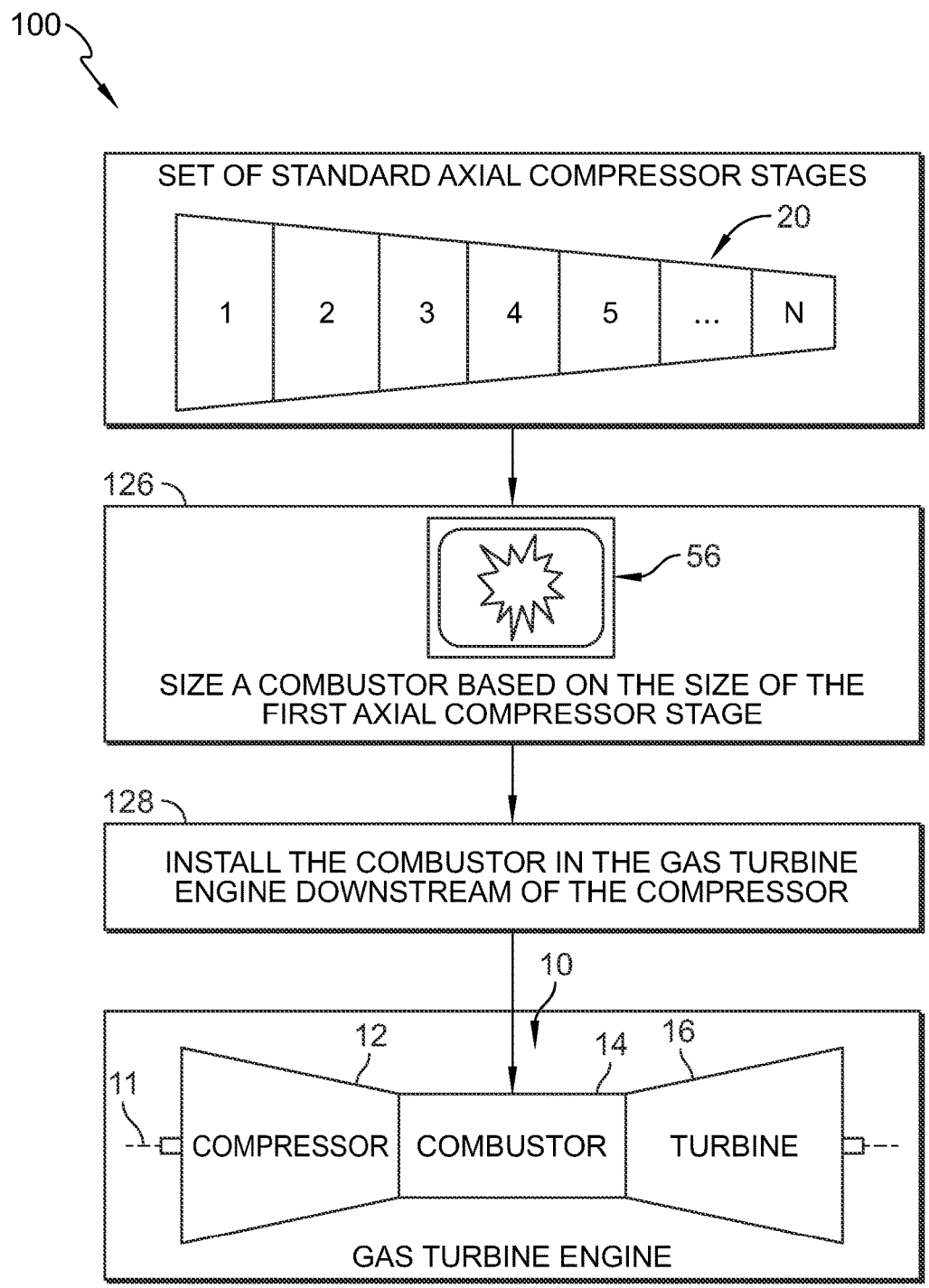
FIG. 4 is a diagrammatic view of the method of assembling the gas turbine engine of FIG. 3 showing the method further comprises sizing a combustion chamber based on the size of the initial axial compressor stage selected from the set of standard axial compressor stages and installing the combustion chamber in the gas turbine engine axially downstream of the compressor.

The method 100 may continue by assembling the combustor 14 for the gas turbine engine 10 as shown in FIG. 4. The method 100 includes sizing a combustion chamber 56 of the combustor 14 based on the size of the first axial compressor stage included in the subset of axial compressor stages 22 as suggested by box 126 in FIG. 4. Once the combustion chamber 56 is sized accordingly, the combustion chamber 56 may be installed in the gas turbine engine 10 axially downstream of the axial or centrifugal compressor as suggested by box 126.

In this way, a single sized combustion chamber 56 for the combustor 14 is used for any subset of axial compressor stages from the set of standard axial compressor stages 20. As one example, the combustor chamber 56 is the same size whether an axial compressor is assembled using stages 3-8 of the standard axial compressor stages 20 or an axial compressor is assembled using stages 2-6, stages 2-9, or stages 4-10.

The method 100 may continue by assembling the turbine 16 for the gas turbine engine 10. A turbine section 16 for the gas turbine engine 10 is provided and installed in the gas turbine engine 10 downstream of the combustor 14.

Figure 5:
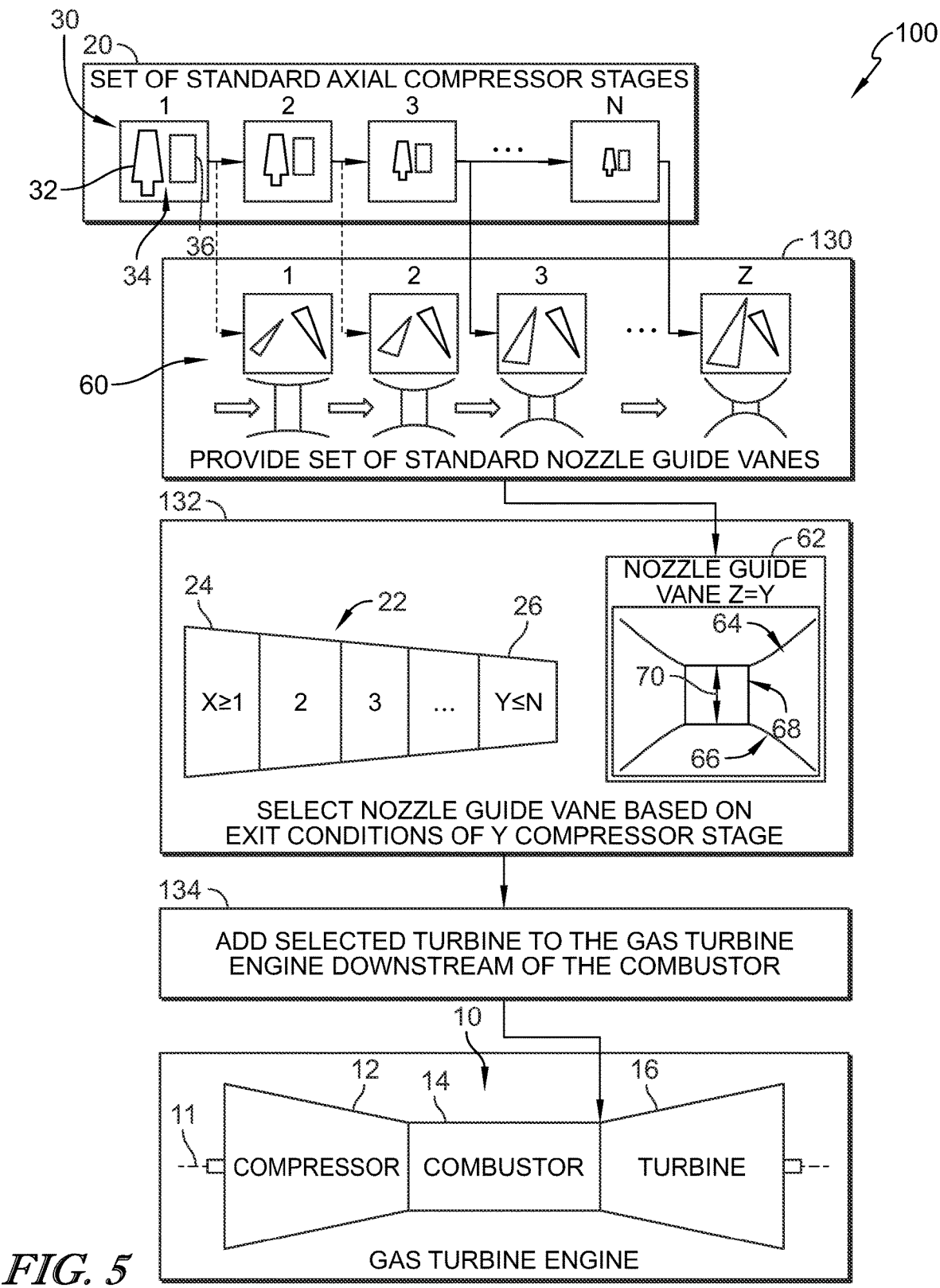
FIG. 5 is a diagrammatic view of the method of assembling the gas turbine engine of FIG. 4 showing the method further comprises selecting one nozzle guide vane from a set of standard nozzle guide vanes based on a size of the furthest downstream axial compressor stage included in the number of sequential axial compressor stages and locating the one nozzle guide vane downstream of the combustor and upstream of a turbine section installed in the gas turbine engine.

The method 100 may further include providing a set of standard nozzle guide vanes 60 as suggested by box 130 in FIG. 5. Each of the nozzle guide vanes included in the set of standard nozzle guide vanes 60 includes an outer platform 64, an inner platform 66, and an airfoil 68 that extends radially between the outer platform 64 and the inner platform 65. The inner platform 66 is spaced apart radially from the outer platform 64 to define a gas path boundary therebetween.

The set of standard nozzle guide vanes 60 ranges from a first nozzle guide vane to a $Z^{th}$ nozzle guide vane as shown in FIG. 5. For the $Z^{th}$ nozzle guide vane, Z is a natural number greater than 1. From the first nozzle guide vane to the $Z^{th}$ nozzle guide vane, a radial height 70 of the airfoil 68 of each nozzle guide vane included in the set of standard nozzle guide vanes 60 gradually decreases in size from the first nozzle guide vane to the $Z^{th}$ nozzle guide vane as shown in FIG. 5.

Based on a size of the last axial compressor stage 26 included in the subset of axial compressor stages 22, one nozzle guide vane 62 is selected from the set of standard nozzle guide vanes 60 as suggested by box 132 in FIG. 5. The method 100 continues by locating the one nozzle guide vane 62 downstream of the combustor 14 and upstream of the turbine section 16.

The fully assembled gas turbine engine 10 has the desired engine performance capability, which falls within the range provided by the set of standard axial compressor stages 20. The method 100 may then be repeated to provide another or second gas turbine engine 10 with the same or a different engine performance capability.

The method 100 includes determining the engine performance capability for a first gas turbine engine 10. The engine performance capability includes a first predetermined inlet corrected flow $F_1$ and a first predetermined pressure ratio $P_1$. The method 100 continues by selecting the initial axial compressor stage 24 from the set of standard axial compressor stages 20 for the first gas turbine engine 10 based on the first predetermined inlet corrected flow $F_1$. Then any number of sequential axial compressor stages from the set of standard axial compressor stages 20 is added downstream of the initial axial compressor stage 24 for the first gas turbine engine 10 based on the first predetermined pressure ratio $P_1$. The resulting subset of axial compressor stages 22 provides the compressor 12 for the first gas turbine engine 10.

To assemble a second gas turbine engine, the engine performance capability for the second gas turbine engine is determined. The engine performance capability for the second gas turbine engine includes a second predetermined inlet corrected flow $F_2$ and a second predetermined pressure ratio $P_2$. The second predetermined inlet corrected flow $F_2$ and the second predetermined pressure ratio $P_2$ are different from the first predetermined inlet corrected flow $F_1$ and the first predetermined pressure ratio $P_1$ for the first gas turbine engine 10 as shown in FIG. 2.

The method 100 includes selecting an initial axial compressor stage from the set of standard axial compressor stages 20 for the second gas turbine engine based on the second predetermined inlet corrected flow $F_2$. The x-coordinate on the graph shown in FIG. 2 corresponds to the initial axial compressor stage for the second gas turbine engine.

Then any number of sequential axial compressor stages from the set of standard axial compressor stages 20 are added downstream of the initial axial compressor stage for the second gas turbine engine based on the second predetermined pressure ratio $P_2$ to provide the compressor for the second gas turbine engine. The angle 29' plotted line connecting the plotted coordinate 28' to the origin corresponds to the number of axial compressor stages to couple downstream of the initial axial compressor stage for the second gas turbine engine. In the illustrative embodiment, the number of sequential compressor stages for the second gas turbine engine is different from the number of sequential compressor stages for the first gas turbine engine 10.

The method 100 continues by selecting one centrifugal compressor 42 from the set of standard centrifugal compressors 40 based on a size of the last axial compressor stage 26 included in the subset of axial compressor stages 22 for the first gas turbine engine 10. The centrifugal compressor 42 is then located downstream of the last axial compressor stage 26 in the first gas turbine engine 10.

Similarly, one centrifugal compressor is selected from the set of standard centrifugal compressors 40 based on a size of the last axial compressor stage included in the subset of axial compressor stages for the second gas turbine engine and located downstream of the last axial compressor stage in the second gas turbine engine. The centrifugal compressor for the second gas turbine engine may be different from the selected centrifugal compressor 42 for the first gas turbine engine 10 in some embodiments. In other embodiments, the centrifugal compressor for the second gas turbine engine may be the same as the selected centrifugal compressor 42 for the first gas turbine engine 10 based on the last axial compressor stage included in the subset of axial compressor stages for the second gas turbine engine.

In some embodiments, the impeller blades 46 and/or the diffuser vanes 52 of the standard centrifugal compressor stage are machined to a predetermined radial height 46H, 52H based on the size of the last axial compressor stage included in the subset of axial compressor stages 22. The blades 46 and/or vanes 52 of the standard centrifugal compressor stage are machined to a first predetermined radial height based on a size of the last axial compressor stage 26 included in the subset of axial compressor stages 22 for the first gas turbine engine 10. The blades 46 and/or vanes 52 of another standard centrifugal compressor stage are machined to a second predetermined radial height based on a size of the last axial compressor stage included in the subset of axial compressor stages for the second gas turbine engine.

In some embodiments, the second predetermined radial height may be different from the first predetermined radial height. In other embodiments, the second predetermined radial height may be the same as the first predetermined radial height.

In other embodiments, the method 100 includes cast different impellers based on the last axial compressor stage included in the subset of axial compressor stages. One impeller having blades with the first predetermined radial height is cast for the first gas turbine engine 10. Another impeller having blades with the second predetermined radial height is cast for the second gas turbine engine.

The method continues by assembling a combustor 14 for the first gas turbine engine 10 and the second gas turbine engine. The method 100 includes sizing a combustion chamber 56 based on the size of the first axial compressor stage included in the subset of axial compressor stages 22. Once the combustion chamber 56 is sized accordingly, the combustion chamber 56 may be installed in the first gas turbine engine 10 axially downstream of the axial or centrifugal compressor. The same combustion chamber 56 may also be installed in the second gas turbine engine axially downstream of the axial or centrifugal compressor.

Each of the combustors chambers 56 for the combustor 14 are then installed in the corresponding gas turbine engine axially downstream of the compressor. The combustor 56 for the first gas turbine engine 10 is installed downstream of the compressor 12. The combustor for the second gas turbine engine is installed downstream of the compressor in the second gas turbine engine.

The method 100 continues selecting one nozzle guide vane 62 from the set of standard nozzle guide vanes 60 for the first gas turbine engine 10 based on a size of the last axial compressor stage included in the subset of axial compressor stages for the first gas turbine engine 10. The nozzle guide vane 62 is then located in the first gas turbine engine 10 downstream of the compressor 12.

Similarly, the method 100 includes selecting another nozzle guide vane from the set of standard nozzle guide vanes 60 based on a size of the last axial compressor stage included in the subset of axial compressor stages for the second gas turbine engine. The nozzle guide vane is then located in the second gas turbine engine downstream of the compressor.

In some embodiments, the selected nozzle guide vane for the second gas turbine engine is a different size compared to the selected nozzle guide vane 62 for the first gas turbine engine 10. In other embodiments, the selected nozzle guide vane for the second gas turbine engine is the same size compared to the selected nozzle guide vane 62 for the first gas turbine engine 10.

The present disclosure relates to a method 100 of assembling a gas turbine engine 10 with a predetermined engine requirement. The emerging attritable engine market may present a shorter engine development time, some ambiguity over the practical definition of 'attritable,' and a wide range of rated thrust values. The attritable market range of rated thrusts may be between 1,520 lbf and 5,200 lbf (or even wider). Such a wide rage may not be achieved by a single engine or even a single high-pressure spool with varying low-pressure spool designs. Low-pressure boost can extend the practical thrust range of a given core, but the range demanded by the market is too wide.

A multistage compressor family—called a 'constellation'— is developed as shown in FIG. 1. The constellation may also be referred to herein as the set of standard axial compressor stages 20. By combining different sequences, i.e. subsets, of the individual stages comprising the complete family, different 'stars' in the constellation may be assembled whose design points cover a range of inlet corrected flow and pressure ratio, all at good performance. Given sufficient market intelligence and proper development strategy, the constellation may be developed such that it not only meets the cycle-level core compressor requirements of a wide range of engine rated thrust, but also meets the cycle-level core compressor requirements of unknown future engines whose rated thrust falls within the envelope covered by the constellation.

The set of standard axial compressor stages 20 includes a range of standard axial compressor stages. The set of standard axial compressor stages 20 are set in size for each stage and do not change. The set of standard axial compressor stages 20 is developed ahead of the exact engine performance capabilities for the specific engine, but covers a wide range of engine performance capabilities. Therefore, the developed set of standard axial compressor stages 20 allows an engine with the desired engine performance capabilities to be rapidly assembled.

To develop the engine 10, the initial axial compressor stage 24 is selected from the set of standard axial compressor stages 20 and any number of sequential stages is added downstream of the initial axial compressor stage 24. The subset of axial compressor stages 22 is selected based on the desired engine performance capability, which falls within the range provided by the set of standard axial compressor stages 20. In this way, a new gas turbine engine 10 may be assembled for the engine rated thrust with minimal additional design and development effort. This decreases the design and build time for the engine.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of assembling a gas turbine engine, the method comprising:
    providing a set of standard axial compressor stages that each include a rotor having a plurality of blades configured to rotate about an axis and a stator having a plurality of stator vanes, wherein the set of standard axial compressor stages ranges from a first compressor stage to an $N^{th}$ compressor stage where N is a natural number greater than 1 and whereby a radial length of the plurality of blades and a radial length of the stator vanes on each compressor stage included in the standard compressor stages gradually decreases in size from the first compressor stage to the $N^{th}$ compressor stage and each compressor stage of the set of standard axial compressor stages is set in size and the size does not change,
    determining an engine performance capability for the gas turbine engine, the engine performance capability including a predetermined inlet corrected flow and a predetermined pressure ratio
    selecting an initial axial compressor stage from the set of standard axial compressor stages for the gas turbine engine based on the predetermined inlet corrected flow, the initial axial compressor stage being the furthest axially upstream compressor stage in a compressor of the compressor for the gas turbine engine, and
    adding two or more sequential axial compressor stages from the set of standard axial compressor stages downstream of the initial axial compressor stage based on the predetermined pressure ratio to provide the gas turbine engine.

2. The method of claim 1, wherein the initial axial compressor stage is any compressor stage other than the $N^{th}$ compressor stage included in the set of standard axial compressor stages.

3. The method of claim 2, wherein a furthest downstream axial compressor stage included in the number of sequential axial compressor stages is not the $N^{th}$ compressor stage.

4. The method of claim 1, further comprising:
    providing a set of standard centrifugal compressors that each include an impeller having a plurality of impeller blades and a diffuser located downstream of the impeller, wherein the set of standard centrifugal compressors ranges from a first centrifugal compressor to an $M^{th}$ centrifugal compressor where M is a natural number greater than 1 and whereby a height of the plurality of impeller blades on each centrifugal compressor included in the standard centrifugal compressors gradually decreases in size from the first centrifugal compressor to the $M^{th}$ centrifugal compressor and each centrifugal compressor of the set of standard centrifugal compressors is set in size and the size does not change,
    selecting one centrifugal compressor from the set of standard centrifugal compressors based on a size of a furthest downstream axial compressor stage included in the number of sequential axial compressor stages, and
    locating the one centrifugal compressor downstream of the furthest axially downstream axial compressor stage.

5. The method of claim 4, wherein the impeller of each centrifugal compressor of the set of standard centrifugal compressors has a same hub radius relative to the axis.

6. The method of claim 4, further comprising sizing a combustor based on the size of the initial axial compressor stage included in the set of standard axial compressor stages and installing the combustor in the gas turbine engine axially downstream of the one centrifugal compressor.

7. The method of claim 6, further comprising:
    providing a turbine section for the gas turbine engine,
    installing the turbine section in the gas turbine engine downstream of the combustor,
    providing a set of standard nozzle guide vanes that each include an outer platform, an inner platform spaced apart radially from the outer platform to define a gas path boundary therebetween, and an airfoil that extends radially between the outer platform and the inner platform, wherein the set of standard nozzle guide vanes ranges from a first nozzle guide vane to a $Z^{th}$ nozzle guide vane where Z is a natural number greater than 1 and whereby a radial height of the gas path boundary of each nozzle guide vane included in the set of standard nozzle guide vanes gradually decreases in size from the first nozzle guide vane to the $Z^{th}$ nozzle guide vane and each nozzle guide vane of the set of standard nozzle guide vanes is set in size and the size does not change,
    selecting one nozzle guide vane from the set of standard nozzle guide vanes based on a size of the furthest downstream axial compressor stage included in the number of sequential axial compressor stages, and
    locating the one nozzle guide vane downstream of the combustor and upstream of the turbine section.

8. The method of claim 1, further comprising
    providing a standard centrifugal compressor stage that includes an impeller having a plurality of impeller blades and a diffuser located downstream of the impeller having a plurality of diffuser vanes, the standard centrifugal compressor stage being set in size and the size does not change,
    machining each of the impeller blades and the diffuser vanes of the standard centrifugal compressor stage to a predetermined radial height based on a size of a furthest downstream axial compressor stage included in the number of sequential axial compressor stages, and
    locating the machined centrifugal compressor downstream of the furthest axially downstream axial compressor stage.

9. The method of claim 1, further comprising
    determining a height of the plurality of impeller blades for an impeller included in a centrifugal compressor based on a size of a furthest downstream axial compressor stage included in the number of sequential axial compressor stages, and
    casting the impeller for the centrifugal compressor with a plurality of impeller blades having the determined height, and
    locating the centrifugal compressor downstream of the furthest axially downstream axial compressor stage.

10. A method comprising:
providing a set of standard axial compressor stages that each include a rotor having a plurality of blades configured to rotate about an axis, wherein the set of standard axial compressor stages ranges from a first compressor stage to an $N^{th}$ compressor stage where N is a natural number greater than 1 and whereby a radial length of the plurality of blades on each compressor stage included in the standard compressor stages gradually decreases in size from the first compressor stage to the $N^{th}$ compressor stage and each compressor stage of the set of standard axial compressor stages is set in size and the size does not change,
determining an engine performance capability for a first gas turbine engine, the engine performance capability including a first predetermined inlet corrected flow and a first predetermined pressure ratio,
selecting an initial axial compressor stage from the set of standard axial compressor stages for the first gas turbine engine based on the first predetermined inlet corrected flow, the initial axial compressor stage being the furthest axially upstream compressor stage in a compressor of the first gas turbine engine, and
adding two or more sequential axial compressor stages from the set of standard axial compressor stages downstream of the initial axial compressor stage for the first gas turbine engine based on the first predetermined pressure ratio to provide the compressor for the first gas turbine engine.

11. The method of claim 10, further comprising
determining an engine performance capability for a second gas turbine engine, the engine performance capability including a second predetermined inlet corrected flow and a second predetermined pressure ratio, the second predetermined inlet corrected flow and the second predetermined pressure ratio are different from the first predetermined inlet corrected flow and the first predetermined pressure ratio for the first gas turbine engine,
selecting an initial axial compressor stage from the set of standard axial compressor stages for the second gas turbine engine based on the second predetermined inlet corrected flow, the initial axial compressor stage being the furthest axially upstream compressor stage in a compressor of the second gas turbine engine, and
adding any number of sequential axial compressor stages from the set of standard axial compressor stages downstream of the initial axial compressor stage for the second gas turbine engine based on the second predetermined pressure ratio to provide the compressor for the second gas turbine engine.

12. The method of claim 11, wherein the number of sequential compressor stages for the second gas turbine engine is different from the number of sequential compressor stages for the first gas turbine engine.

13. The method of claim 11, wherein the initial axial compressor stage for one of the first gas turbine engine and the second gas turbine engine is any compressor stage other than the $N^{th}$ compressor stage included in the set of standard axial compressor stages.

14. The method of claim 11, wherein a furthest downstream axial compressor stage included in the number of sequential axial compressor stages for one of the first gas turbine engine and the second gas turbine engine is not the Nth compressor stage.

15. The method of claim 11, further comprising
providing a set of standard centrifugal compressors that each include an impeller having a plurality of impeller blades and a diffuser located downstream of the impeller, wherein the set of standard centrifugal compressors ranges from a first centrifugal compressor to an $M^{th}$ centrifugal compressor where M is a natural number greater than 1 and whereby a height of the plurality of impeller blades on each centrifugal compressor included in the set of standard centrifugal compressors gradually decreases in size from the first centrifugal compressor to the $M^{th}$ centrifugal compressor and each centrifugal compressor of the set of standard centrifugal compressors is set in size and the size does not change,
selecting one centrifugal compressor from the set of standard centrifugal compressors based on a size of a furthest downstream axial compressor stage included in the number of sequential axial compressor stages for the first gas turbine engine, and
locating the one centrifugal compressor downstream of the furthest axially downstream axial compressor stage in the first gas turbine engine.

16. The method of claim 15, further comprising
selecting one centrifugal compressor from the set of standard centrifugal compressors based on a size of a furthest downstream axial compressor stage included in the number of sequential axial compressor stages for the second gas turbine engine, and
locating the one centrifugal compressor downstream of the furthest axially downstream axial compressor stage in the second gas turbine engine,
wherein the one centrifugal compressor for the second gas turbine engine is different from the one centrifugal compressor for the first gas turbine engine.

17. The method of claim 11, further comprising sizing a combustor based on the size of the first axial compressor stage included in the set of standard axial compressor stages and installing the combustor in the first gas turbine engine axially downstream of the compressor.

18. The method of claim 17, further comprising installing the combustor in the second gas turbine engine axially downstream of the compressor, wherein the number of sequential compressor stages for the second gas turbine engine is different from the number of sequential compressor stages for the first gas turbine engine.

19. The method of claim 11, further comprising
providing a set of standard nozzle guide vanes that each include an outer platform, an inner platform spaced apart radially from the outer platform to define a gas path boundary therebetween, and an airfoil that extends radially between the outer platform and the inner platform, wherein the set of standard nozzle guide vanes ranges from a first nozzle guide vane to a $Z^{th}$ nozzle guide vane where Z is a natural number greater than 1 and whereby a radial height of the gas path boundary of each nozzle guide vane included in the set of standard nozzle guide vanes gradually decreases in size from the first nozzle guide vane to the $Z^{th}$ nozzle guide vane and each nozzle guide vane of the set of standard nozzle guide vanes is set in size and the size does not change,
selecting one nozzle guide vane from the set of standard nozzle guide vanes based on a size of a furthest downstream axial compressor stage included in the number of sequential axial compressor stages for the first gas turbine engine, locating the one nozzle guide vane in the first gas turbine engine downstream of the compressor, selecting one nozzle guide vane from the set of standard nozzle guide vanes based on a size of a furthest downstream axial compressor stage included in the number of sequential axial compressor stages for the second gas turbine engine, and locating the one nozzle guide vane in the second gas turbine engine downstream of the compressor, wherein the one nozzle guide vane for the second gas turbine engine is a different size compared to the one nozzle guide vane for the first gas turbine engine.

20. The method of claim 11, further comprising providing a standard centrifugal compressor stage that includes an impeller having a plurality of impeller blades and a diffuser located downstream of the impeller having a plurality of diffuser vanes, the standard centrifugal compressor stage being set in size and the size does not change, machining each of the impeller blades and the diffuser vanes of the standard centrifugal compressor stage to a first predetermined radial height based on a size of a furthest downstream axial compressor stage included in the number of sequential axial compressor stages for the first gas turbine engine, providing another standard centrifugal compressor stage and machining each of the impeller blades and the diffuser vanes of the another standard centrifugal compressor stage to a second predetermined radial height based on a size of a furthest downstream axial compressor stage included in the number of sequential axial compressor stages for the second gas turbine engine, wherein the second predetermined radial height is different from the first predetermined radial height.

* * * * *